(12) United States Patent  (10) Patent No.: US 8,878,689 B2
Sanderford  (45) Date of Patent: Nov. 4, 2014

(54) AUTOMATED METER READER

(75) Inventor: Hugh Britton Sanderford, Covington, LA (US)

(73) Assignee: Sensus Spectrum LLC, Raleigh, NC (US)

( * ) Notice: Subject to any disclaimer, the term of this patent is extended or adjusted under 35 U.S.C. 154(b) by 1449 days.

(21) Appl. No.: 11/682,182

(22) Filed: Mar. 5, 2007

(65) Prior Publication Data

US 2008/0218164 A1  Sep. 11, 2008

(51) Int. Cl.
| | |
|---|---|
| G08C 19/16 | (2006.01) |
| G08B 23/00 | (2006.01) |
| G08C 15/06 | (2006.01) |
| G01R 33/00 | (2006.01) |
| G01R 21/00 | (2006.01) |
| G01D 4/00 | (2006.01) |

(52) U.S. Cl.
CPC .......... *G01D 4/008* (2013.01); *Y04S 20/30* (2013.01); *Y02B 90/247* (2013.01); *Y04S 20/50* (2013.01)
USPC ............ 340/870.02; 340/870.11; 340/870.01; 324/260; 701/62

(58) Field of Classification Search
USPC ........... 340/870.01, 870.02, 870.11; 324/260; 702/62
See application file for complete search history.

(56) References Cited

U.S. PATENT DOCUMENTS

| | | | | |
|---|---|---|---|---|
| 4,688,038 A | * | 8/1987 | Giammarese | 340/870.02 |
| 5,148,101 A | * | 9/1992 | Balch et al. | 324/137 |
| 5,621,397 A | * | 4/1997 | Mutch et al. | 340/870.02 |
| 5,870,140 A | * | 2/1999 | Gillberry | 348/160 |
| 6,115,676 A | * | 9/2000 | Rector et al. | 702/62 |
| 2003/0193405 A1 | * | 10/2003 | Hunt et al. | 340/870.02 |
| 2004/0027253 A1 | * | 2/2004 | Marsh et al. | 340/870.02 |
| 2004/0131231 A1 | * | 7/2004 | Smilansky | 382/103 |
| 2006/0272426 A1 | * | 12/2006 | Jarrell et al. | 73/861.12 |
| 2007/0038394 A1 | * | 2/2007 | Gagnon et al. | 702/61 |
| 2007/0057814 A1 | * | 3/2007 | Goldberg et al. | 340/870.02 |
| 2008/0218164 A1 | * | 9/2008 | Sanderford | 324/260 |
| 2009/0058676 A1 | * | 3/2009 | Orlosky | 340/870.02 |

* cited by examiner

*Primary Examiner* — Hai Phan
*Assistant Examiner* — Amine Benlagsir
(74) *Attorney, Agent, or Firm* — Oblon, Spivak, McClelland, Maier & Neustadt, L.L.P.

(57) ABSTRACT

A meter reader for reading a meter have a display portion displaying a total output of a quantity being metered and plural incremental outputs defining the total output. The meter reader includes a sensing mechanism for sensing one of the plural incremental outputs in the meter display portion, and a processing unit coupled to the sensing mechanism for accumulating incremental outputs sensed by the sensing mechanism and for determining accumulated meter output over a time period based on the accumulated incremental outputs. Also included is an output mechanism for outputting the accumulated meter output determined by the processing unit. In one example, the sensing mechanism includes a sensor for sensing only a least significant incremental output in usage included in the meter display portion, and an emitter for illuminating the least significant incremental output included in the meter display portion. Further, the sensing mechanism senses the least significant incremental output included in the meter display portion at least once every full cycle of the least significant incremental output.

42 Claims, 16 Drawing Sheets

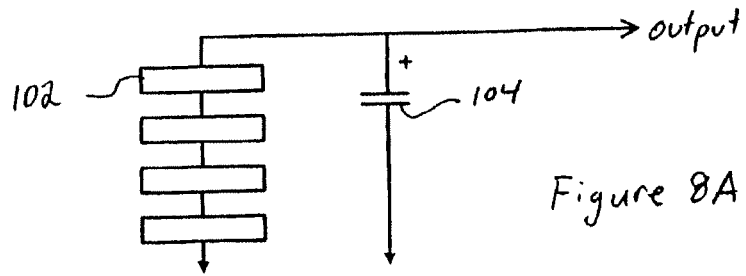
Figure 8A
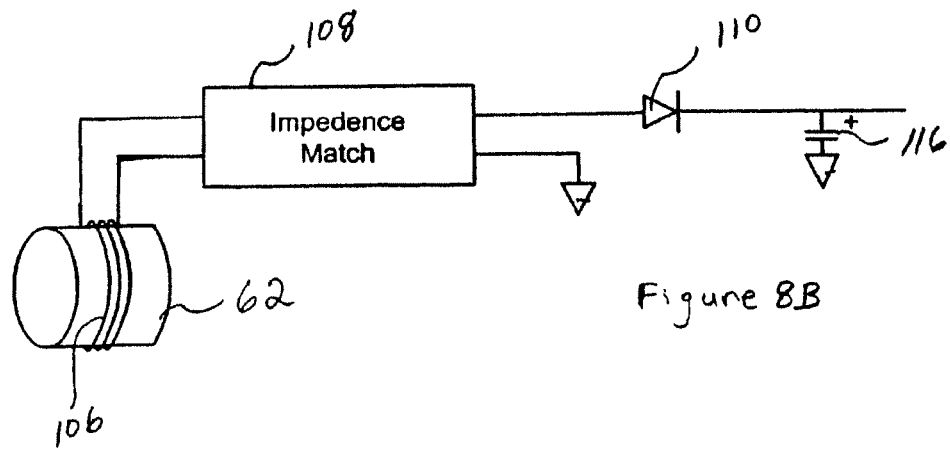
Figure 8B
Figure 9
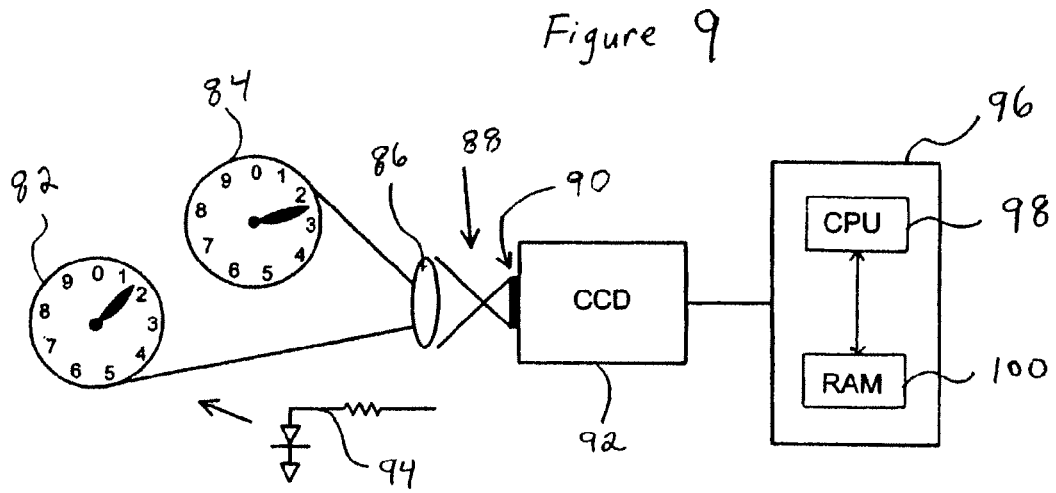

AUTOMATED METER READER

BACKGROUND OF THE INVENTION

1. Field of the Invention

The present invention relates to automated meter reading, and more particularly to a meter reader including a sensor for sensing only a least significant incremental output in usage included in a meter display portion.

2. Discussion of the Background

Modem households are powered by electricity, gas and water, etc. The household receives electricity from the electrical company, in many cases a public utility. Similarly, natural gas is supplied by a gas provider, and water is supplied by the water commission.

The consumption of electricity, gas and water is measured by meters which have been installed at the customer's house. For example, the electricity meter measures the amount of electricity (i.e., power) used by the household and the consumption of electric power is indicated by readings on the meter. The electrical meter typically includes a number of dials which show the power consumption in Kilowatt hours. To bill the customer, it is necessary for the electrical utility to obtain a power consumption reading from the meter. Therefore, before the electrical utility can issue bills to its customers, the electrical meters at each house must be manually read. This represents a significant expenditure of manual effort. The situation is further exacerbated by the inaccessibility of some meters, e.g., located inside the basement of a house, and the unavailability for reading during normal working hours when the occupants of the house are not at home, but are at work.

To contain costs and enhance a competitive position in the utility market place, many utility companies are investigating and implementing automated meter reading capabilities. For example, background automated meter reading solutions sense the current consumption by physically coupling a sensing device to the rotation of the display dials, magnetically coupling the sensing device to the meter, or electrically coupling the sensing device to an LCD or other type of display.

However, in all of these cases, the sensing device must be physically placed within the electrical meter housing (i.e., under the glass covering). This requires an extremely labor-intensive process of retrofitting the meters. This retrofitting process also has a potential of damaging the meter.

Further, other background meter reading devices capture an image corresponding to the entire meter display portion (i.e., all display dials) and transmit this entire image for processing. This increases the battery consumption used by the meter reader and requires complicated circuitry.

In addition, the background devices only fit one particular type of meter and therefore several different types of meter readers are required. Thus, the background meter reading devices are generally expensive to implement, maintain and repair.

SUMMARY OF THE INVENTION

Accordingly, one object of the present invention is to solve the above-noted and other problems.

Another object of the present invention is to provide a novel meter reader that does not require an extensive retrofitting process.

Still another object of the present invention is to provide a novel meter reader than can be used with a variety of meters from various venders under all environmental conditions.

Yet another object of the present invention is to provide a novel wireless meter reader that can transmit metering information to a radio receiver, from which a utility company can gather and process the transmitted information.

Another object of the present invention is to provide a low-cost meter reader that is simple to implement, maintain and repair.

To achieve these and other objects, the present invention provides a novel meter reader for reading a meter having a display portion displaying a total output of a quantity being metered and plural incremental outputs defining the total output. The meter reader includes a sensing mechanism for sensing one of the plural incremental outputs in the meter display portion, and a processing unit coupled to the sensing mechanism for accumulating incremental outputs sensed by the sensing mechanism and for determining accumulated meter output over a time period based on the accumulated incremental outputs. Also included is an output mechanism for outputting the accumulated meter output determined by the processing unit. In one example of the present invention, the sensing mechanism includes a sensor for sensing only a least significant incremental output in usage included in the meter display portion, and an emitter for illuminating the least significant incremental output included in the meter display portion. Further, the sensing mechanism senses the least significant incremental output included in the meter display portion at least once every full cycle of the least significant incremental output. The present invention also relates to a method and computer program product for reading a meter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8A is an overview illustrating a series of photo cells with a parallel capacitor as a first alternative for powering the meter reader according to the present invention;

FIG. 8B is an overview illustrating another alternative for powering the meter reader according to the present invention;

FIG. 9 is an overview illustrating another example of a meter reading according to the present invention;

DESCRIPTION OF THE PREFERRED EMBODIMENTS

Figure 1A:
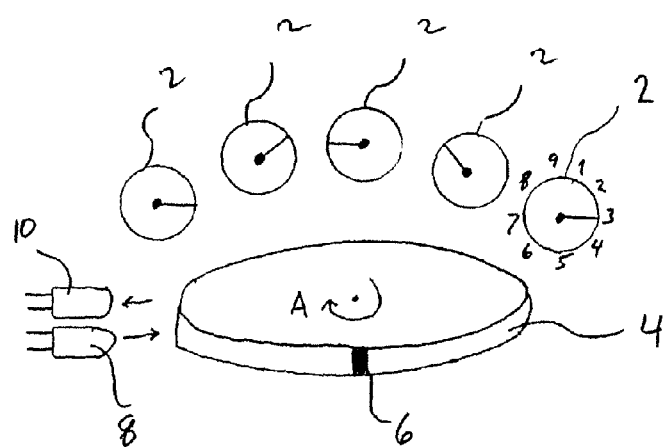
FIGS. 1A and 1B illustrates a first example of reading a meter according to the present invention.

Referring now to the drawings, wherein like reference numerals designate identical or corresponding parts throughout the several views, the present invention will be described.

Turning first to FIG. 1A, this figure illustrates a first example of optically reading a meter according to the present invention. In this example, a meter reader according to the present invention includes a light emitter 8 and a light receiver 10. The light emitter 8 emits light towards a rotating disk 4 included in the electric meter. Light reflected from the rotating disk 4 is received by the light receiver 10. Note that in this example the user's current consumption (e.g., metering data) is determined from the rotating disk 4 and not the plurality of dials 2 accompanied with the meter. Also note the rotating disk 4 generally includes a single mark 6.

Figure 1B:
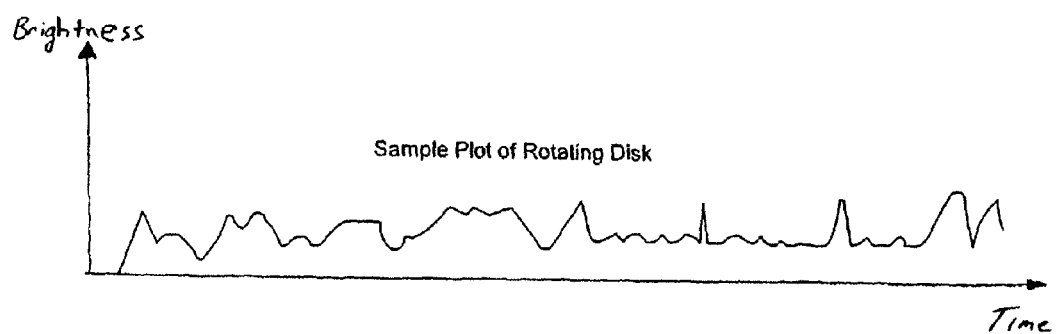

Thus, as the disk 4 rotates, the optical receiver 10 receives a varying amount of light. For example, FIG. 1B illustrates an example of different brightness levels the light receiver 10 measures as the disk 4 makes a single revolution. These brightness values may be used to determine the amount of power provided to the customer as brightness values above or below a predetermined threshold value may be used to denote a single revolution of the disk 4.

Figure 2:
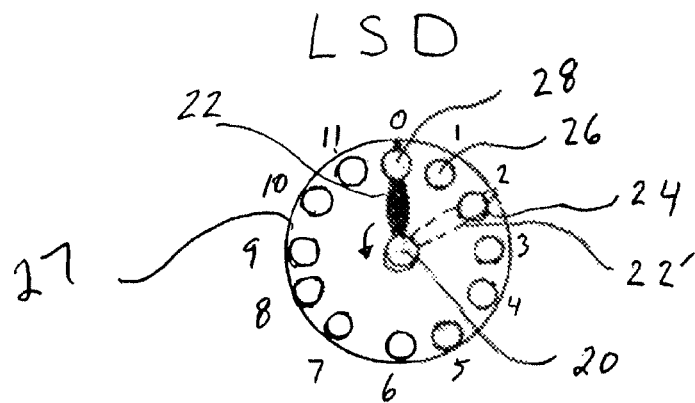
FIG. 2 illustrates a second example of reading a meter according to the present invention.

FIG. 2 illustrates a second example of optically detecting metering data according to the present invention. In this example, only a least significant incremental output (e.g., least significant dial) of the meter is read. In more detail, as shown in FIG. 2, an illuminating emitter 20 (such as an infrared LED) is disposed over a center of a least significant dial 27. Further, a plurality of sensors 24, 26, 28, etc. are disposed around a circumference of the least significant dial 27 at locations corresponding to count numbers on the least significant dial 27 (i.e., count numbers 0, 1, 2, 3 . . . 11). In this example, it is preferable the emitter 20 is positioned directly over the center portion of the least significant dial 27 so as to illuminate the entire dial 27.

The plurality of sensors 24, 26 and 28, etc. may then be used to determine the position of a dial hand 22 based on a difference of reflections of light from the emitter 20. For example, the meter reader according to this example may determine that the dial hand 22 is at the count number 0 because the sensor 28 receives significantly less light reflection from the emitter 20 (i.e., because the dial hand 22 is passing thereunder). A processing unit may then process the information sensed by the sensor 28 along with a previous reading so as to determine the amount of power used by the customer.

In another example, it is also possible to concentrate on the sensor that will most likely detect the presence of the dial hand 22. For example, as shown in FIG. 2, if the dial hand 22 is moving in a counterclockwise direction (as shown by the arrow in the drawing) and it is known the dial was just currently sensed by the sensor 24 (as shown by the dash dial hand 22'), the processing unit can concentrate on sensors 26 and 28 and ignore the other sensors or pay less attention to them so as to further reduce the amount of required processing (and accordingly reduce the amount of battery consumption required to operate the meter reader).

Thus, because only the least significant dial is monitored according to the present invention, the size of the image captured is significantly reduced compared to that of the background type meter reading devices. That is, as discussed above, the background devices capture and process an image corresponding to all of the dials. This increases the amount of processing equipment required for the device, as well as the amount of battery consumption by the device. On the contrary, the present invention is significantly able to reduce the amount of battery consumption, the complexity of the device, and provide accurate information about the customer's usage by reading only the least significant dial. Further, the sensing mechanism (i.e., sensors 24, 26 and 28, etc.) are configured to sense the least significant dial 27 at least once every full rotation of the least significant dial 27. Therefore, the amount of power delivered to the meter is properly read.

Figure 3A:
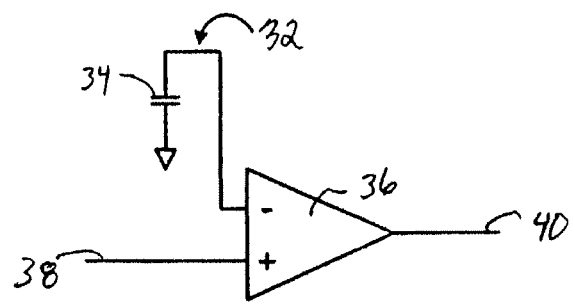
FIG. 3A illustrates a comparator according to the present invention for reducing an image captured by a camera to one bit per pixel.
Figure 3B:
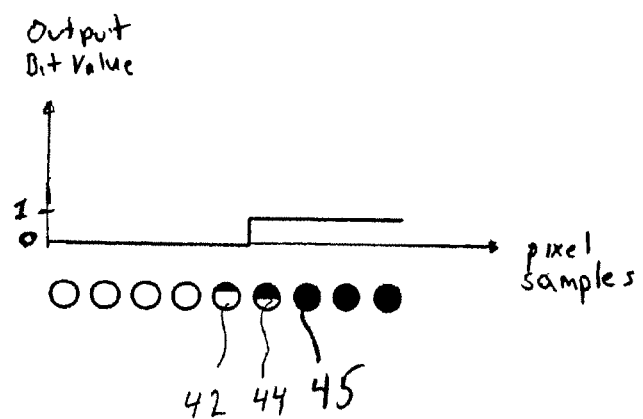
FIG. 3B is a pictorial diagram illustrating an example of pixel values that are extracted from the captured image and converted to bit values.

Another example of reducing the battery consumption and complexity of the device is shown in FIGS. 3A and 3B. In more detail, FIG. 3A illustrates a comparator 36 according to the present invention for reducing an image captured by a camera to one bit per pixel, and FIG. 3B is a pictorial diagram illustrating an example of pixel values that are extracted from the captured image and converted to bit values. In this example, rather than using a plurality of sensors 24, 26, 28, etc. as shown in FIG. 2, the sensing mechanism includes a camera (such as a CCD camera or a CMOS sensing camera) for capturing an image of the least significant dial. The comparator 36 then reduces the image captured by the camera to one bit per pixel.

That is, an average gray-level value 32 is first determined for an entire image. The average gray-level value 32 may change according to ambient light conditions, which ensures that the present invention properly functions over all ambient light conditions. As shown, the average value 32 is used as the negative input to the comparator 36 and the picture stream is input into the input 38 of the comparator 36. Then, at an output 40 of the comparator 36, each pixel is set to be either black or white (i.e., the minimum output voltage or maximum output voltage of the comparator, respectively). Thus, the captured image is reduced to one bit per pixel (i.e., a 0 or a 1). This feature is clearly illustrated in FIG. 3B.

In more detail, the pixel samples 42, 44, 45, etc. are input into the input 38 of the comparator 36. As shown, the output bit value remains at 0 until the pixel sample 44 is input. Because the pixel sample 44 includes mostly a black value in relation to the present gray-level value 32, the output bit value is increased to 1. Thus, because the captured image is reduced to one bit per pixel, the battery usage required to operate the meter reader according to the present invention is further reduced.

Figure 4A:
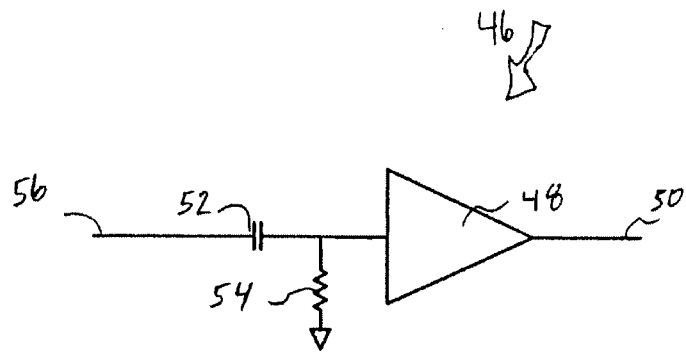
FIG. 4A illustrates a circuit for generating differential video information according to the present invention.
Figure 4B:
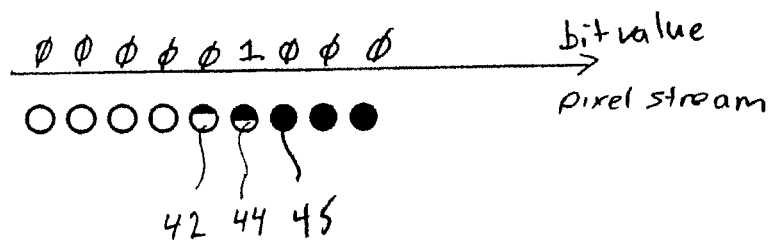
FIG. 4B is a pictorial diagram illustrating the generation of the differential video information according to the present invention.
Figure 5:
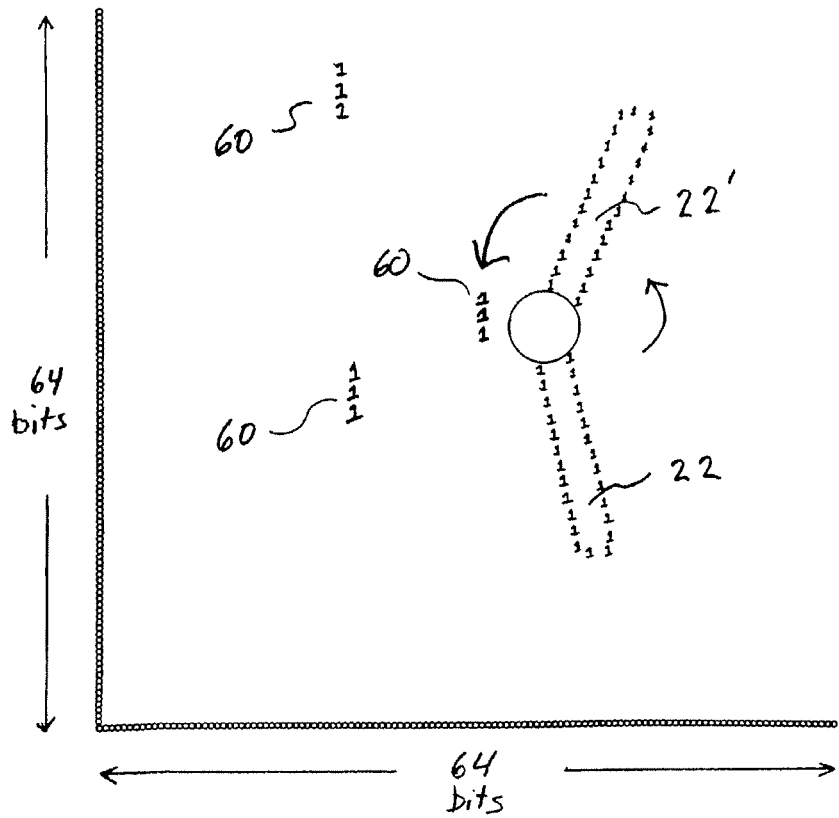
FIG. 5 is a pictorial diagram illustrating edge-detection data from two separate image scans according to the present invention.

FIGS. 4A, 4B and 5 illustrate yet another example of further reducing the required battery usage for operating the meter reader according to the present invention. In these figures, the present invention performs an edge-detection algorithm to reduce the image captured by the camera to one bit per pixel. The present invention may then perform a difference calculation on subsequent images to determine the amount of power used by the consumer. In more detail, FIG. 4A illustrates a circuit 46 which may be used to perform the edge-detection method according to the present invention. The circuit 46 includes an amplifier 48 having an input 56 and output 50, a capacitor 52, and a resistor 54 connected to ground. The pixels of the captured image are input to the input 56 of the circuit 46 and a bit value is output via the output 50. This feature is clearly illustrated in FIG. 4B. Note FIG. 4B differs from FIG. 3B in that the bit value for the pixel 45 is 0 and not 1 as in FIG. 3b. This is because the circuit 46 according to the present invention performs an edge-detection algorithm and only the edges are set to a bit value 1, for example. That is, a bit value is set to be 1 if and only if a respective pixel value is greater than the gray-level value and a previous pixel value was less than the gray-level value.

The edge detection algorithm is further illustrated in FIG. 5. As shown, the captured image of the least significant dial is a 64×64 bit image. Note also that two positions of the dial hand are shown in FIG. 5. That is, the dial hand 22' shows the position of the dial hand during a first reading of the meter and the dial hand 22 shows the subsequent reading of the meter (similar to the dial hands 22 and 22' shown in FIG. 2). As shown, the edge-detection algorithm sets all values to 0 other than the edges of the dial hand 22 and 22', which are set to 1. Note, however, that noise 60 does occur in the image and these values will also be converted to a bit value of 1. These values may be easily ignored as they do not contribute to a shape of the dial hands 22, 22'. Thus, as clearly shown in FIG. 5, the present reading of the meter may be easily accomplished by performing a difference calculation on subsequent images (the differences between the dial hands 22 and 22'). This technique is particularly advantageous in that degraded image sensors resulting in bad pixels will not effect the overall performance of the meter reader. Alternatively, the edge-detection algorithm could simply transmit the change from the last image, which retrieves the movement of the hands, but eliminates any static information (i.e., both images would not have to be transferred—only the change from the last image is transferred).

Figure 6:
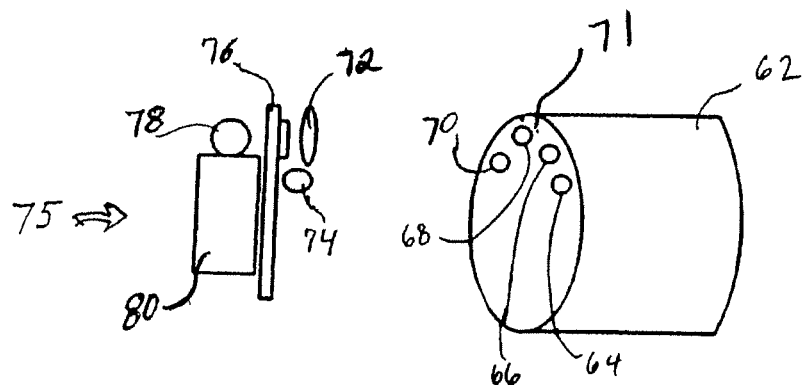
FIG. 6 is an overview illustrating in more detail the components included in the meter reader according to the present invention.

Turning now to FIG. 6, which is an overview illustrating in more detail the components included in the meter reader according to the present invention. As shown, the meter reader 75 according to the present invention includes a radio transmitter 80, a power unit 78, a camera 76 (such as a CCD camera), a lens 72 and an infrared LED 74. The infrared LED 74 illuminates a display portion 71 of a meter 62 having usage dials 64, 66, 68 and 70. Note according to the present invention, only the least significant dial 64 is captured by the meter reader 75. Thus, as discussed above, accurate metering data can be obtained according to the present invention, while at the same time reducing the amount of battery consumption.

Figure 7A:
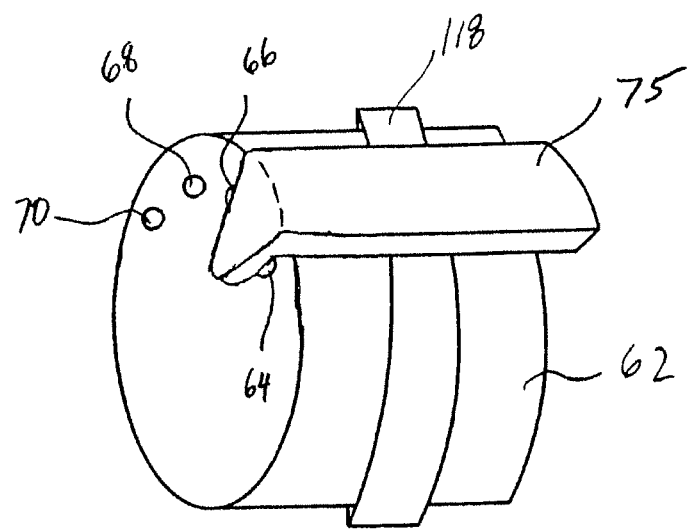
FIG. 7A is an overview illustrating the meter reader being externally mounted to the meter according to the present invention.
Figure 7B:
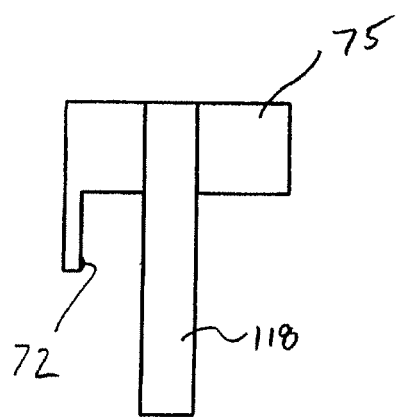
FIG. 7B is a side view of the meter reader shown in FIG. 7A.

Turning now to FIGS. 7A and 7B, which are an overview illustrating the meter reader being externally mounted to the meter and a side view of the meter reader, respectively. In more detail, as shown in FIG. 7A, the meter reader 75 is mounted to an external surface of the meter 62 via a mounting mechanism 118. Further, the meter reader 75 is positioned over the least significant dial 64 so as to sense information only about the least significant dial 64. The mounting mechanism 118 may also include a mounting strap equipped with a pressure switch so as to serve as a temper detection mechanism, for example. The tamper detection sensor may be a pressure sensitive switch, a reflective sensor, reed switch and magnet or other means to detect that the RF module has been removed from the meter. The coupling mechanism 118 may also include an inductive coupling mechanism (such as coil wires wrapped around the external surface of the meter 62) for capturing electric field magnetic radiation from the meter 62 and converting the captured radiation to power for the meter reader 75 (this feature is discussed in more detail with reference to FIG. 8B). In addition, FIG. 7B illustrates a side view of the meter reader 75 showing the lens 72 positioned to receive light reflected from the least significant dial 64 and to be captured by the camera 76.

Additionally, the power unit 80 illustrated in FIG. 6 may include rechargeable battery cells to provide power to the meter reader 75. Alternatively, as shown in FIG. 8A, the power unit 80 may include a series of photo cells 102 in parallel with a capacitor 104 to provide power to the meter reader 75. In addition, FIG. 8B illustrates yet another alternative of the power unit 80 in which coil wires 162 are wrapped around the external surface of the meter 62 to capture electric magnetic field radiation from the meter so as to provide power to the meter reader 75. That is, the coil wires 106 extract electromagnetic field radiation from the meter 62 which is then impedance matched in the impedance matching circuit 108. The voltage then passes through a diode 110 for supplying power to the meter reader. Also shown is a Germanium/Schottkey 116.

Turning now to FIG. 9, which is an overview illustrating yet another example of a meter reader according to the present invention. In this example, the meter reader reads two least significant dials 82 and 84 (rather than just one least significant dial). As shown, the meter reader includes a lens 86 associated with the sensing mechanism 92 (e.g., a CCD camera), and a processing unit 96 having a CPU 98 and a Random Access Memory (RAM) 100. The least significant dials 82 and 84 are illuminated by an LED 94 and light reflected off the dials 82 and 84 is captured via the lens 86 and CCD camera 92. The processing unit 96 then processes the information sensed by the sensing mechanism 92 so as to determine the amount of power used by the consumer. Further, a depth of field 88 between the lens 86 and optical surface 90 of the CCD camera 92 is set to ensure the proper tolerance such that the least significant dials 82 and 84 are accurately read.

Figure 10A:
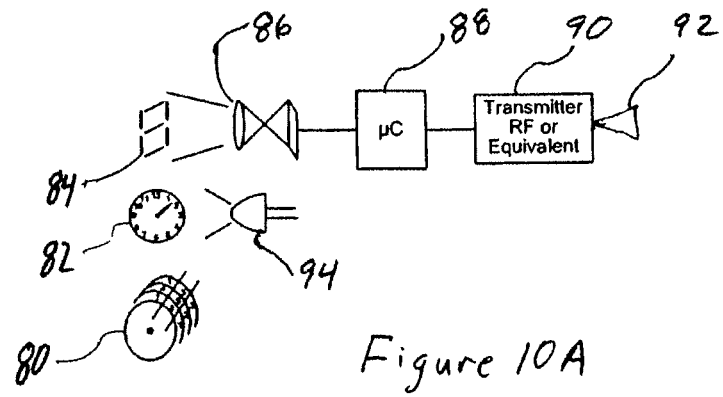
FIGS. 10A and 10B are overviews illustrating transmission and reception aspects of the meter reading according to the present invention.
Figure 10B:
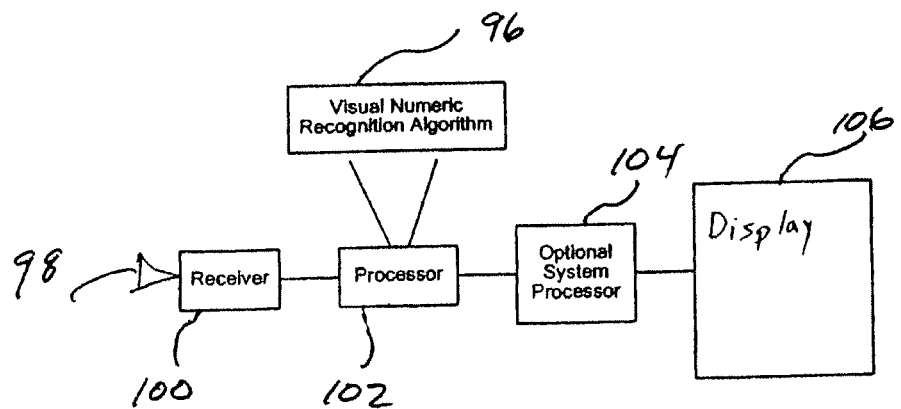

Turning now to FIGS. 10A and 10B, which will be used to illustrate an overall operation of a meter reading system according to the present invention. As shown in FIG. 10A, an LED 94 illuminates a display portion of a meter. In this example, the display portion may include an LCD 84, a mechanical dial 82 having a dial hand, or a series of mechanical dials 80 rotating on a same axis. The sensing mechanism including a lens 86 and camera 88 is used to sense information about the dial. A processing unit (not shown) processes the information sensed by the sensing mechanism so as to determine the amount of power used by the consumer. The meter reader also includes a transmitter 90 with an antenna 92 for transmitting the metering data to a centralized location for further processing. The transmitter 90 may format the image data into an on-air message and transmit this data to a receiver 100 including an antenna 98 (see FIG. 10B). The received image may then be formatted as necessary by a processor 102 and displayed on a display 106. Further, the processor 102 may utilize a visual numeric recognition algorithm (optical character recognition) 96 or other type of optical processor 104 to display the proper metering data.

Figure 11A:
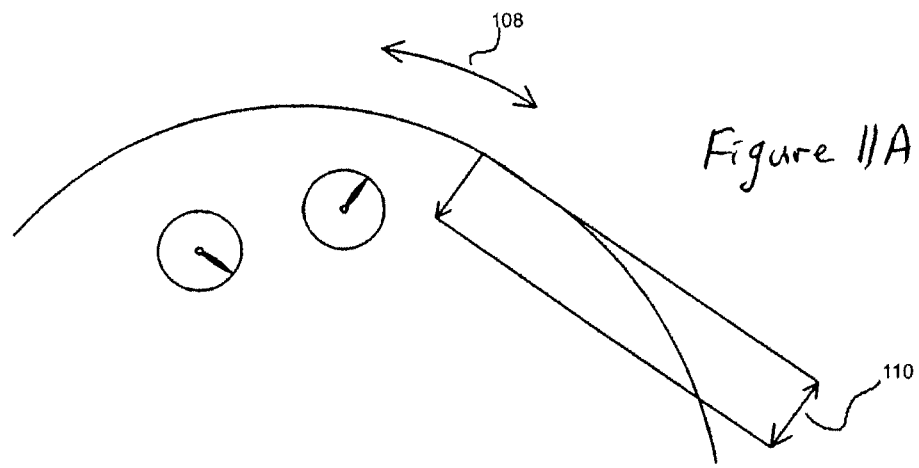
FIGS. 11A and 11B are pictorial diagrams illustrating how to properly install and align the electric meter according to the present invention.
Figure 11B:
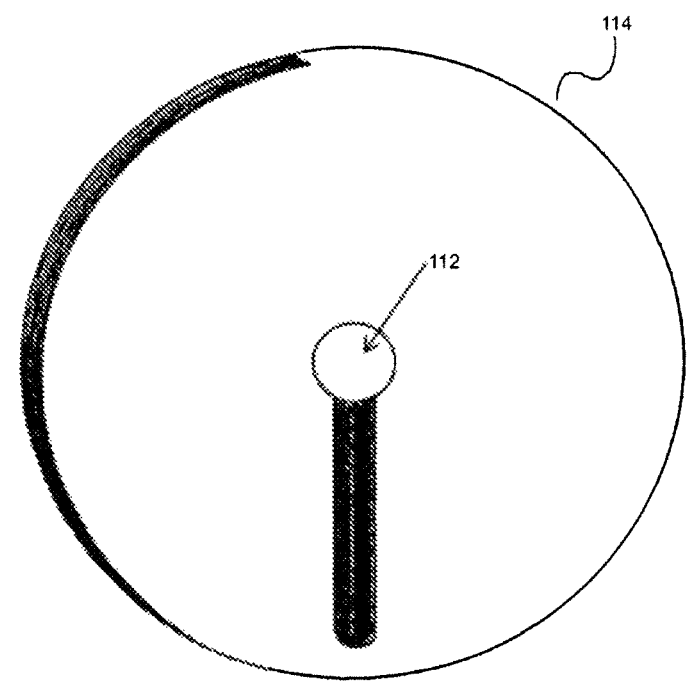

Turning now to FIGS. 11A-B, in FIG. 11A, the position of the sensor relative to the dials will be perfectly in the radius of the meter. An adjustment may be required (rotation of sensor or housing) to line up with desired meter dial. For instance, the installer may need to key the rotational alignment 108. Once the adjustment is made the alignment can be made to perfectly line up 110 as is illustrated in FIG. 11A. In FIG. 11B a dial 114 is shown with a center knob 112. Using an image of the face of the dial 112 the CPU lines up with the dial circle. In less than 4000 tries, usually closer to 500 tries, the CPU subtracts until a minimum circle remains.

Figure 12:
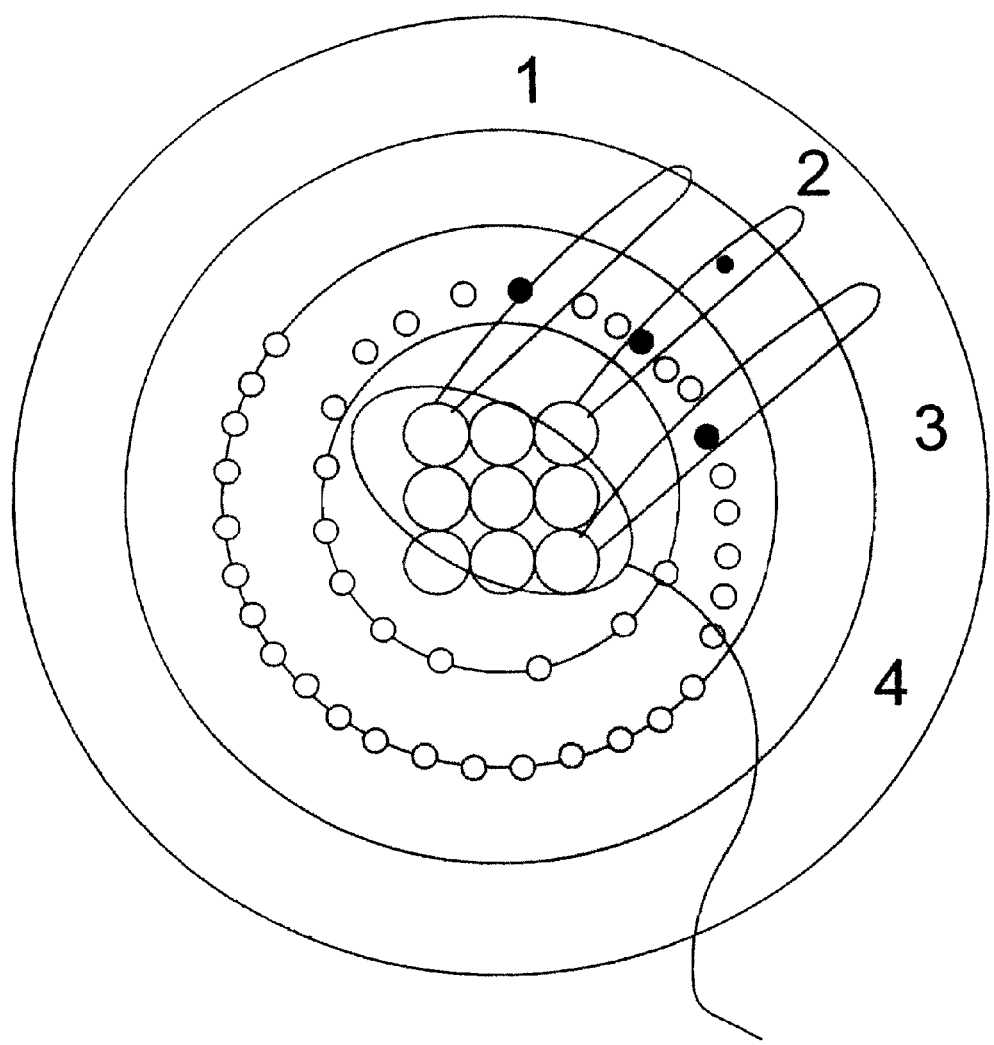
FIG. 12 is a pictorial diagram illustrating how an image processing algorithm compensates for possible alignment errors with the meter reading according to the present invention.

FIG. 12 illustrates how an image processing algorithm of the present invention compensates for possible alignment error in the meter reading. Using the alignment error probability, the recognition algorithm becomes tolerant to the error source 116.

Figure 13:
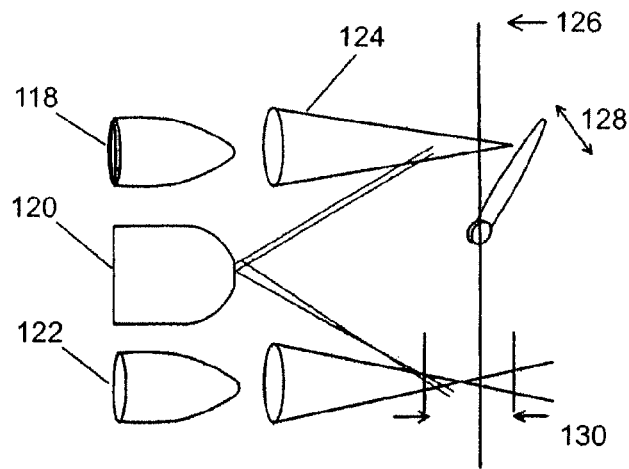
FIG. 13 is an overview illustrating a preferable depth of field for the meter reader according to the present invention.

FIG. 13 shows the preferable depth of field for a meter reader in the present invention. In this embodiment, the infrared signal is sent by an infrared transmitter 120 through dusty glass and is measured using two receivers 118 and 122 and a lens 124. The measurement is taken over a change 128 of 10 to 50 sec in the dial hand plane 126. The depth of field 130 is an example of the preferable depth for the measurements in this embodiment.

Figure 14A:
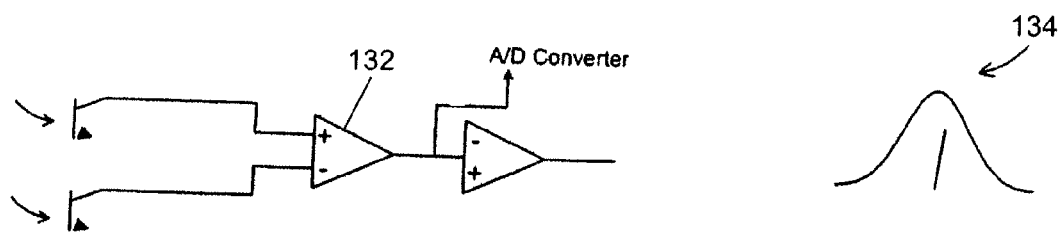
FIG. 14A is a circuit illustrating a hardware based light dark differentiator circuit.

Once the measurement is accomplished, the signal is processed using a hardware based light/dark differentiator circuit 132 shown in FIG. 14A. Accordingly, once the signal is processed, determining when the hand goes by 134 can be determined from a hump in the A/D sampled signal.

Figure 14B:
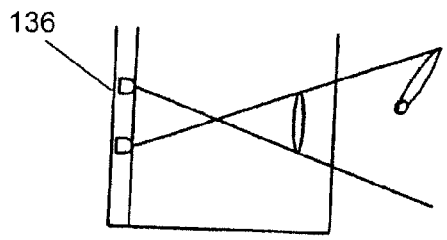
FIG. 14B is an overview illustrating mounting of detector and optics to view hands on meter dial.

FIG. 14B illustrates a housing 136 that houses the electro-optics used in the measurement process. The focal plane is determined from a lens 124 used to focus the measured beam. In addition the housing 136 includes a circuit board.

Figure 15A:
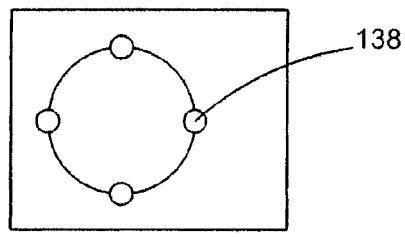
FIGS. 15A-15C illustrate adaptive filtering methods according to the present invention to correct glass imperfections and other obstructions with the meter.
Figure 15B:
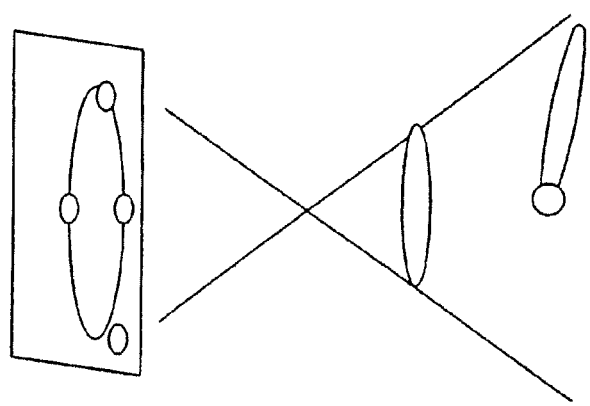
Figure 15C:
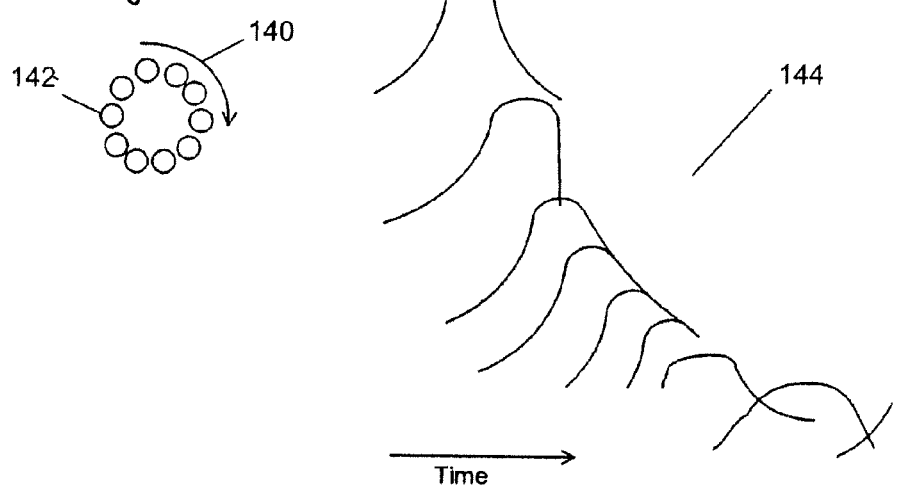

FIG. 15A shows an example of the housing 136 from the front. On the housing 136 are infrared sensors 138 similar to the receivers 118 and 122 shown in FIG. 13, one to ten sensors 138 may be used in this configuration. FIG. 15B is a wider view of the housing 136 that also includes the lens 124 and the meter arm. When glass imperfections or obstructions between the housing 136 and the meter cause bad readings, an adaptive filter can be used to provide corrections in the data. In FIG. 15C ten sensors 142 are shown. Using these ten sensors 142 as well as known direction and max speed 140 each LED sensor 142 is put through correlation and produces outputs like 138. The algorithm can then pick the best match, however all ten sensors contribute to the correlation. This process makes the data received from the sensors adaptive.

Figure 16:
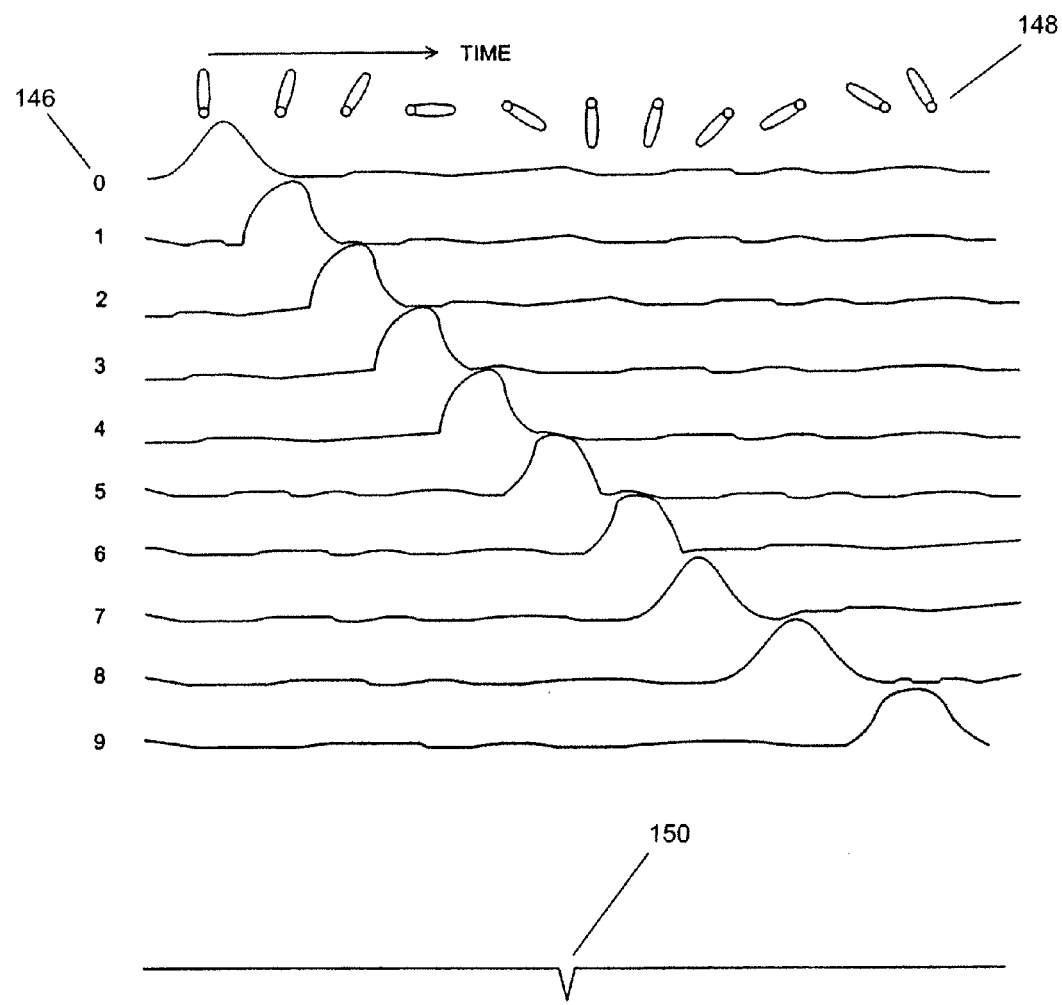
FIG. 16 illustrates a Kalman filter prediction method according to the present invention.

Additionally, Kalman filtering can be used in the present invention. Kalman filtering is use of "expert" information to eliminate illegal outputs—thus improving accuracy—i.e. the expert system knows the dials go forward, that they can't go at a rate faster than 200 amps per hour on a residential electric meter. Using Kalman filtering the movement of the meter can be predicted. In FIG. 16 the signals from 10 sensors 146 are shown at different points in time and different positions of the meter dial 148. The actual position of the meter hand can be predicted using a Kalman filter.

Figure 17:
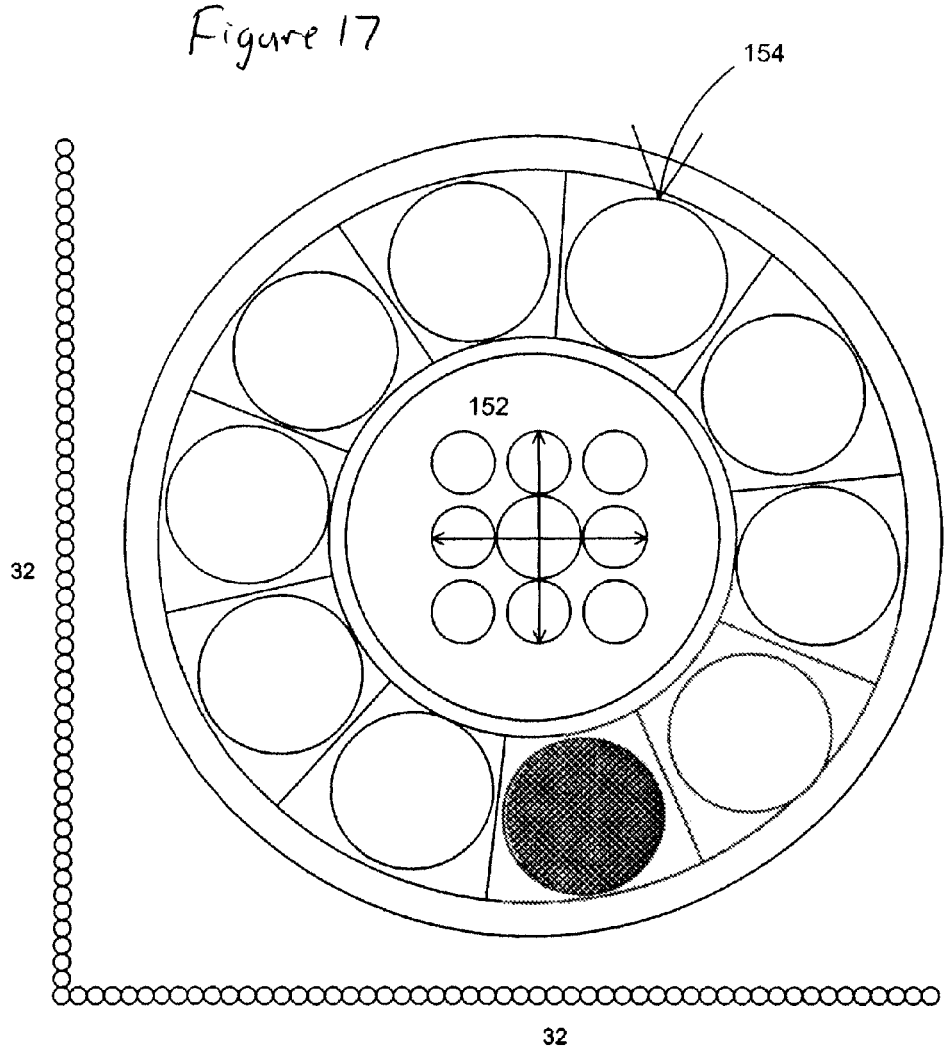
FIG. 17 is a pictorial diagram illustrating how the predictable movement of the meter dial can advantageously be monitored by a sensor according to the present invention.

Further FIG. 17 illustrates that the predictable movement of the meter dial calculated using the Kalman filter can advantageously be monitored by a sensor. The error 152 can be accounted for in this system and the multiple sensitive areas of the CCD response 154 can be taken into account. The worst case scenario is that the system will hold too long on a digit, skip the next digit, but have the correct reading.

Figure 18:
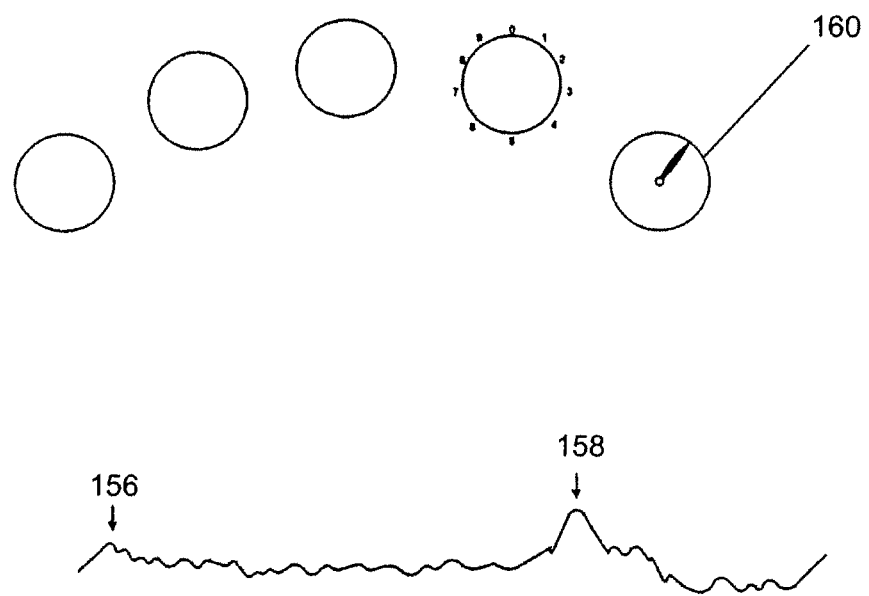
FIG. 18 is a pictorial diagram illustrating the sensor mechanism according to the present invention tracking the number of times a dial hand has crossed a certain point on the dial face.

FIG. 18 illustrates the sensor mechanism which tracks the number of times a dial hand crosses a certain point on the dial face 160. The acoustic 156 and the signature 158 are both seen in the signal shown in FIG. 18.

Figure 19:
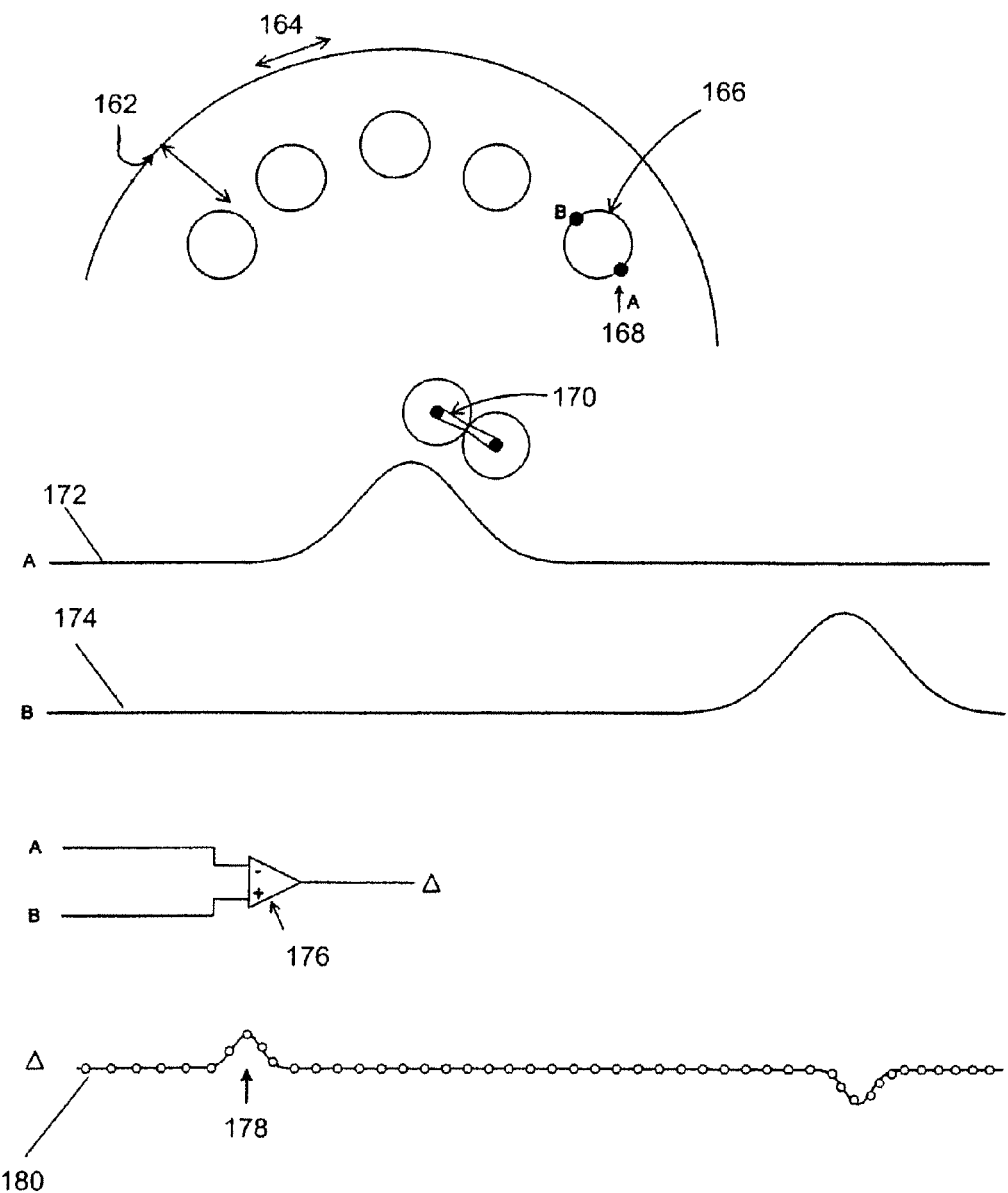
FIG. 19 illustrates one example of the present invention to overcome alignment problems.

FIG. 19 shows an example of techniques used to overcome alignment problems. In the example shown in FIG. 19, the accuracy of the sensors 162 is good but the alignment 164 is poor. However the sensor position 166 can be used to overcome alignment accuracy problems. Two LED sensors are lined up in the rotation axis of error. In this example, receivers A and B 168 are used. The outputs for sensor A 172 and for sensor B 174 are compared in order to dynamically compensate for water, temperature, aging, ambient light and other similar potential problems occurring in the measurement. Using the differential amplifier 176, the change in the signal is accounted for by the system. When a hump 178 is detected in the differential signal 180 the optical systems do not have to be used for a certain amount of time depending on the speed of the wheel. This process greatly enhances the battery life of the device.

Additionally in FIG. 19 there is shown the example when hands appear to the sensors to touch 170, this phenomenon may fool the optics. Accordingly, four LEDS can be used to achieve quadriture detection capability. Further this system can also detect reverse rotation such as in the case of energy theft.

Figure 20:
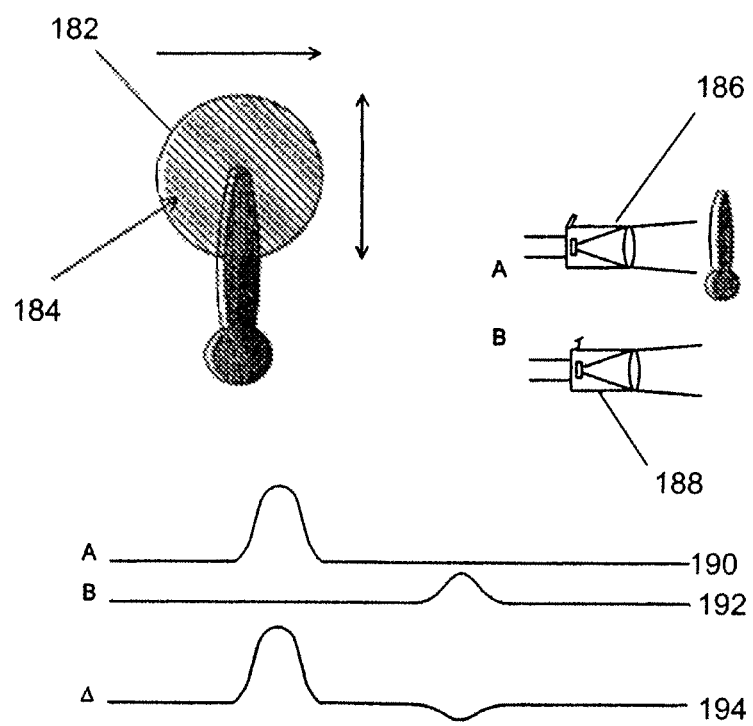
FIG. 20 illustrates how an optical sensor can be used to read a dial hand according to the present invention.

FIG. 20 shows another example of the system of the present invention used to determine when the meter hand passes a certain point. FIG. 20 shows an optical sensor 182 with a sensitive area 184. Each of the optical sensors 186 and 188 are positioned similarly. In this embodiment the IR sensors 186 and 188 corresponding to signals "A" 190 and "B" 192 respectfully have a built-in lens. When the hand measurement is misaligned the difference signal 193 can be used to determine the correct measurement. It should also be noted that the measuring device is tamper proof and unaffected by changes in the ambient light. In order to achieve these features the sensors may have adaptive shutter speed to prevent overload of the sensors CCD dynamic range. In addition, even if one revolution measurement is missed the sensing algorithm can adapt to this mis-measurement This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD- ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Additionally, this invention may be applied to temperature, pressure, flow rate, and other industrial processes.

Obviously, numerous modifications and variations of the present invention are possible in light of the above teachings. It is therefore to be understood that within the scope of the appended claims, the invention may be practiced otherwise than as specifically described herein.

The invention claimed is:

1. A meter reader for reading a meter having a display portion displaying a total output of a quantity being metered and plural incremental outputs defining the total output, comprising:
    an infrared (IR) light illuminating device configured to illuminate the display portion;
    a sensing device having a plurality of sensors and configured to optically sense only one incremental output of the plural incremental outputs defining the total output in the meter display portion, including a differential decoder configured to compare respective signals, obtained from at least one pair of spatially separated sensors of the plurality of sensors, with each other and to generate incremental outputs based on the comparing, the sensing device being disposed over the only one incremental output;
    a processing unit coupled to the sensing device and configured to accumulate said incremental outputs sensed by the sensing device and to determine accumulated meter output over a time period based on the accumulated incremental outputs;
an output device configured to output the accumulated meter output determined by the processing unit; and
    a power management device configured to disable the infrared illuminating device and the sensing device after incremental outputs for periods of time determined based on the rate of change of the quantity being metered,
    wherein the only one incremental output corresponds to a least significant incremental output of the plural incremental outputs defining the total output,
    wherein the plurality of sensors are configured to sense only the least significant incremental output in usage included in the meter display portion, and
    wherein the infrared illuminating device is configured to directly illuminate only the least significant incremental output included in the meter display portion.

2. The meter reader of claim 1, wherein the plurality of sensors are configured to sense the least significant incremental output included in the meter display portion at least once every full cycle of the least significant incremental output.

3. The meter reader of claim 1, further comprising:
    a mounting member configured to mount the sensing device on an external surface of the meter in optical communication with said only one incremental output of the plural incremental outputs.

4. The meter reader of claim 3, wherein the mounting member mounts the meter reader on the external surface of the meter in alignment with said only one incremental output of said plural incremental outputs.

5. The meter reader of claim 1, further comprising:
    a mounting member configured to mount the plurality of sensors and the infrared illuminating device on an exterior surface of the meter in optical communication with the least significant incremental output included in the meter display portion.

6. The meter reader of claim 3 or 5, wherein the mounting member includes an inductive coupling device configured to capture electric magnetic field radiation from the meter and to convert the captured radiation to power for the meter reader.

7. The meter reader of claim 6, wherein the coupling device comprises coil wires wrapped around the exterior surface of the meter so as to capture the electric magnetic field radiation from the meter.

8. The meter reader of claim 3 or 5, wherein the mounting member comprises a mounting strap and a tamper detection device configured to detect unauthorized removal of the meter reader from the meter.

9. The meter reader of claim 1,
    wherein the plurality of sensors are disposed only around a periphery of the least significant incremental output included in the meter display portion.

10. The meter reader of claim 9, further comprising:
    a mounting member configured to mount the plurality of sensors and the infrared illuminating device on an exterior surface of the meter in direct optical communication with only the least significant incremental output,
    wherein the mounting member mounts the plurality of sensors and the infrared illuminating device such that the infrared illuminating device is positioned directly over a center portion of the least significant incremental output.

11. The meter reader of claim 10, wherein the mounting member includes an inductive coupling device configured to capture an electric magnetic field radiation from the meter and to convert the captured radiation to power for the meter reader.

12. The meter reader of claim 1, further comprising:
    a power unit configured to provide power to the meter reader and including one of a battery, a series of photo cells, and an inductive coupling device configured to capture electric magnetic field radiation from the meter.

13. The meter reader of claim 1, wherein the processing unit is configured to perform Kalman filtering on the accumulated incremental outputs.

14. The meter reader of claim 1, wherein the plurality of sensors include at least an infrared light sensor.

15. The meter reader of claim 1, wherein the plurality of sensors include at least a visible light sensor.

16. A meter reader for reading a meter having a display portion displaying a total output of a quantity being metered and plural incremental outputs defining the total output, comprising:
    an infrared (IR) light illuminating device configured to illuminate the display portion;
    a sensing device configured to generate a two dimensional image limited to only a least significant incremental output, of the plural incremental outputs defining the total output, in usage included in the meter display portion, the sensing device being disposed over the least significant incremental output;
    a processing unit coupled to the sensing device and configured to detect and accumulate incremental outputs from the two dimensional image generated by the sensing device and to determine accumulated meter output over a time period based on the accumulated incremental outputs;
    an output device configured to output the accumulated meter output determined by the processing unit; and
    a power management device configured to disable the infrared illuminating device and the sensing device after incremental outputs for periods of time determined based on the rate of change of the quantity being metered,
wherein the processing unit is configured to perform a difference calculation on consecutive images generated by the sensing device to determine the accumulated meter output.

17. The meter reader of claim 16, wherein the sensing device is further configured to generate the two dimensional image, which is limited to the least significant incremental output, by discarding portions of an originally obtained two dimensional image that do not correspond to the least significant incremental output.

18. A method of reading a meter having a display portion displaying a total output of a quantity being metered and plural incremental outputs defining the total output, comprising:
illuminating the display portion with infrared (IR) light;
optically sensing, with a sensing device having a plurality of sensors, only one incremental output of the plural incremental outputs defining the total output in the meter display portion, and differential decoding respective signals obtained from at least one pair of spatially separated sensors of the plurality of sensors by comparing the respective signals, obtained from the at least one pair of spatially separated sensors of the plurality of sensors, with each other and generating incremental outputs based on the differential decoding, the sensing device being disposed over the only one incremental output;
accumulating said incremental outputs sensed in the optically sensing step;
determining accumulated meter output over a time period based on the accumulated incremental outputs;
outputting the accumulated meter output determined in the determining step; and
disabling the illuminating and the optically sensing after incremental outputs for periods of time determined based on the rate of change of the quantity being metered,
wherein the only one incremental output corresponds to a least significant incremental output of the plural incremental outputs defining the total output,
wherein the illuminating directly illuminates only the least significant incremental output included in the meter display portion; and
wherein the optically sensing optically senses only the least significant incremental output in usage included in the meter display portion.

19. The method of claim 18, further comprising:
optically sensing only the least significant incremental output in usage included in the meter display portion at least once every full cycle of the least significant incremental output.

20. The method of claim 18,
wherein the optically sensing optically senses only the least significant incremental output in usage included in the meter display portion from an external surface of the meter.

21. The method of claim 18, further comprising:
capturing electric magnetic field radiation from the meter; and
converting the captured radiation to power for a meter reader.

22. The method of claim 18, further comprising:
performing Kalman filtering on the accumulated incremental outputs.

23. The method of claim 18, wherein the plurality of sensors include at least an infrared light sensor.

24. The method of claim 18, wherein the plurality of sensors include at least a visible light sensor.

25. A method of reading a meter having a display portion displaying a total output of a quantity being metered and plural incremental outputs defining the total output, comprising:
illuminating the display portion with infrared (IR) light;
generating, by a sensing device, a two dimensional image limited to only a least significant incremental output, of the plural incremental outputs defining the total output, in usage included in the meter display portion, the sensing device being disposed over the least significant incremental output;
detecting plural incremental outputs from the two dimensional image;
accumulating said incremental outputs detected in the detecting step;
determining accumulated meter output over a time period based on the accumulated incremental outputs;
outputting the accumulated meter output determined in the determining step;
calculating differences between consecutive two dimensional images generated by the generating step to determine the accumulated meter output; and
disabling the illuminating and the generating after incremental outputs for periods of time determined based on the rate of change of the quantity being metered.

26. A meter reader for reading a meter having a display portion displaying a total output of a quantity being metered and plural incremental outputs defining the total output, comprising:
an infrared (IR) light illuminating device configured to illuminate the display portion;
a sensing device having a plurality of sensors and configured to optically sense only one incremental output of the plural incremental outputs defining the total output in the meter display portion, the sensing device including means for differentially decoding by comparing respective signals, obtained from at least one pair of spatially separated sensors of the plurality of sensors, with each other, the sensing device being disposed over the only one incremental output;
a processing unit configured to accumulate incremental outputs sensed by the sensing device and to determine accumulated meter output over a time period based on the accumulated incremental outputs;
an output device configured to output the accumulated meter output determined by the processing unit; and
a power management device configured to disable the infrared light illuminating device and the sensing device after incremental outputs for periods of time determined based on the rate of change of the quantity being metered,
wherein the only one incremental output corresponds to a least significant incremental output of the plural incremental outputs defining the total output,
wherein the sensing device senses only the least significant incremental output in usage included in the meter display portion, and
wherein the illuminating device is configured to illuminate only the least significant incremental output included in the meter display portion.

27. The meter reader of claim 26, wherein the sensing device senses the least significant incremental output included in the meter display portion at least once every full cycle of the least significant incremental output.

28. The meter reader of claim 26, further comprising:
a mounting member configured to mount the sensing device on an external surface of the meter in optical communication with said only one incremental output of the plural incremental outputs.

29. The meter reader of claim 26, further comprising:
a mounting member configured to mount the sensing device and the illuminating device on an exterior surface of the meter in optical communication with the least significant incremental output included in the meter display portion.

30. The meter reader of claim 28 or 29, wherein the mounting member comprises a tamper detection device configured to detect unauthorized removal of the meter reader from the meter.

31. The meter reader of claim 28, wherein the mounting member mounts the meter reader on the external surface of the meter in alignment with said only one incremental output of said plural incremental outputs.

32. The meter reader of claim 28 or 29, wherein the mounting member includes an inductive coupling device configured to capture electric magnetic field radiation from the meter and to convert the captured radiation to power for the meter reader.

33. The meter reader of claim 26, further comprising:
a mounting member configured to mount the sensing device and the illuminating device on an exterior surface of the meter in direct optical communication with the only incremental output, the only one incremental output corresponding to the least significant incremental output,
wherein the mounting member is configured to position the sensing device and the illuminating device directly over a center portion of the least significant incremental output.

34. The meter reader of claim 33, wherein the mounting member includes an inductive coupling device configured to capture an electric magnetic field radiation from the meter and to convert the captured radiation to power for the meter reader.

35. The meter reader of claim 26, further comprising:
a power unit configured to provide power to the meter reader and including one of a battery, a series of photo cells, and an inductive coupling device configured to capture electric magnetic field radiation from the meter.

36. The meter reader of claim 26, wherein the processing unit is further configured to perform Kalman filtering on the accumulated incremental outputs.

37. A meter reader for reading a meter have a display portion displaying a total output of a quantity being metered and plural incremental outputs defining the total output, comprising:
an infrared (IR) light illuminating device configured to illuminate the display portion;
a sensing device configured to generate a two dimensional image limited to only a least significant incremental output, of the plural incremental outputs defining the total output, in usage included in the meter display portion, the sensing device being disposed over the least significant incremental output;
a processing unit configured to detect and accumulate incremental outputs from the two dimensional image generated by the sensing device, and to determine accumulated meter output over a time period based on the accumulated incremental outputs;
an output device configured to output the accumulated meter output determined by the processing unit; and
a power management device configured to disable the infrared light illuminating device and the sensing device after incremental outputs for periods of time determined based on the rate of change of the quantity being metered,
wherein the processing unit is configured to perform a difference calculation on consecutive two dimensional images generated by the sensing device to determine the accumulated meter output.

38. A non-transitory computer readable medium having stored thereon a computer program product that when executed by a computer causes the computer to perform a method for reading a meter having a display portion displaying a total output of a quantity being metered and plural incremental outputs defining the total output, comprising:
instructing an infrared (IR) light illuminating device to illuminate the display portion;
instructing a sensing device having a plurality of sensors to optically sense, with the plurality of sensors, only one incremental output of the plural incremental outputs defining the total output in the meter display portion, the sensing device being disposed over the only one incremental output;
performing differential decoding by comparing respective signals, obtained from at least one pair of spatially separated sensors of the plurality of sensors, with each other and generating incremental outputs based on the comparing;
accumulating said incremental outputs to determine accumulated meter output over a time period based on the accumulated incremental outputs;
outputting the accumulated meter output determined by the accumulating; and
disabling the instructing of the infrared light illuminating device and the instructing of the sensing device after incremental outputs for periods of time determined based on the rate of change of the quantity being metered,
wherein the only one incremental output corresponds to a least significant incremental output of the plural incremental outputs defining the total output,
wherein the instructing of the sensing device instructs the sensing device to sense only the least significant incremental output in usage included in the meter display portion, and
wherein the instructing of the illuminating device instructs the illuminating device to illuminate only the least significant incremental output included in the meter display portion.

39. The non-transitory computer readable medium of claim 38, further comprising:
instructing the sensing device to sense the least significant incremental output included in the meter display portion at least once every full cycle of the least significant incremental output.

40. The non-transitory computer readable medium of claim 38, further comprising:
instructing an inductive coupling device to capture electric magnetic field radiation from the meter and to convert the captured radiation to power for a meter reader.

41. The non-transitory computer readable medium of claim 38, further comprising:
performing Kalman filtering on the accumulated incremental outputs.

42. A non-transitory computer readable medium having stored thereon a computer program product that when executed by a computer causes the computer to perform a method for reading a meter having a display portion displaying a total output of a quantity being metered and plural incremental outputs defining the total output, comprising:
- instructing an infrared (IR) light illuminating device to illuminate the display portion;
- instructing a sensing device to generate a two dimensional image limited to only a least significant incremental output, of the plural incremental outputs defining the total output, in usage included in the meter display portion, the sensing device being disposed over the least significant incremental output;
- instructing a processing unit to detect plural incremental outputs from the two dimensional image;
- accumulating said incremental outputs to determine accumulated meter output over a time period based on the accumulated incremental outputs;
- outputting the accumulated meter output determined by the accumulating;
- calculating differences between consecutive two dimensional images generated by the sensing device to determine the accumulated meter output; and
- disabling the instructing of the infrared light illuminating device and the instructing of the sensing device after incremental outputs for periods of time determined based on the rate of change of the quantity being metered.

* * * * *